Patented Feb. 5, 1935

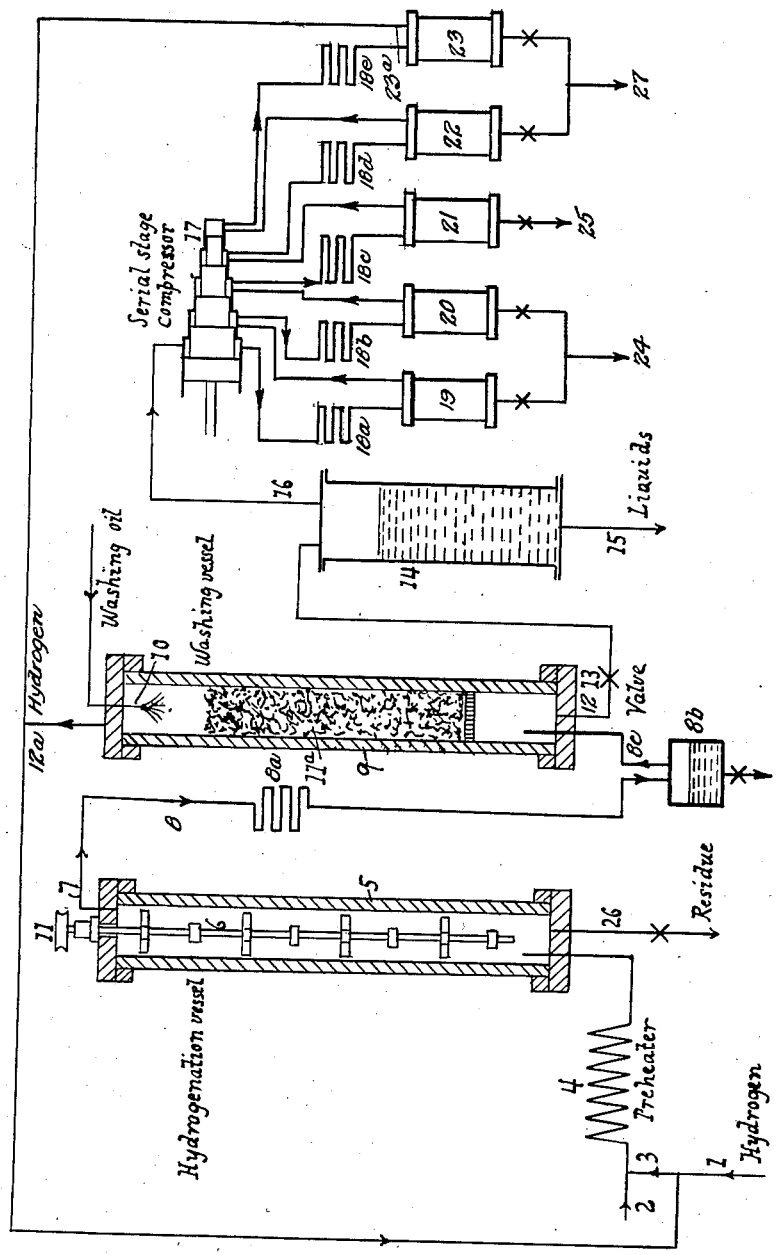

1,989,822

UNITED STATES PATENT OFFICE 1,989,822

DESTRUCTIVE HYDROGENATION OF CARBONACEOUS MATERIALS

Mathias Pier, Heidelberg, Germany, assignor, by mesne assignments, to Standard-I. G. Company, Linden, N. J., a corporation of Delaware Application August 8, 1929, Serial No. 384,481
In Germany September 25, 1928

2 Claims. (Cl. 196—53)

This invention relates to improvements in the separation of valuable products from the mixtures of gases and vapours issuing from treatments by destructive hydrogenation of distillable carbonaceous materials.

The mixtures of gases and vapours leaving the reaction chamber or chambers when distillable carbonaceous materials such as coals of all varieties, tars, mineral oils and the like are subjected to destructive hydrogenation, for the purpose of producing valuable liquid products, still contain valuable constituents after the substances which are liquid at ordinary temperatures have been separated out.

I have now found that a separation of valuable products, for example, gaseous hydrocarbons from the said gases and vapours produced during destructive hydrogenation from which the substances which are liquid at ordinary temperature and pressure have preferably been previously separated, for example by washing with an organic solvent, is obtained in an advantageous manner by effecting a condensation by means of strong cooling or great compression or both. For example the products which leave the reaction vessel in the vaporous state under the reaction pressure and from which the products which are liquid at ordinary temperature have preferably been separated can be subjected to a still greater compression without previous cooling. Or the residual products remaining after separating off the products which are liquid at ordinary temperature may be cooled to a certain extent and then compressed, and this manner of working may be repeated several times. Further the said residual products may be condensed, preferably fractionally, by strong cooling, for example by cooling below ordinary temperatures, such as 50° centigrade below zero or even lower. The fractional condensation may be effected in several stages of decreasing temperatures or increasing pressure or both. Moreover the vaporous and gaseous products recovered from the waste gases from the destructive hydrogenation when solvents are employed, can be separated into their constituents by strong compression or by strong cooling or by both.

In all cases when carrying out the process in accordance with the present invention, the carrying back of the constituents of low boiling point into the hot zone when employing the hydrogenating gas in a cycle, is prevented, whereas otherwise in some cases these constituents of low boiling point would not be separated. In accordance with the present invention it is possible to recover the hydrogen in a comparatively pure state, and to effect an excellent fractionation of the gaseous and vaporous reaction products obtained.

The said destructive hydrogenation process is advantageously carried out in the presence of catalysts immune from poisoning by sulphur, and in particular of catalysts comprising molybdenum, tungsten, chromium or another metal of the sixth group of the periodic system or cobalt as such or in the form of their compounds.

Atmospheric pressure or low pressures for example of 5 or 10 atmospheres may be employed in the said process when highly active catalysts such as those comprising molybdenum are employed but higher pressures such as 20, 50, 100, 150, 200 atmospheres or even more for example 300, 500, 1000, 2000, 3000 or 5000 atmospheres are as a rule advantageous.

The accompanying drawing represents an elevation of a plant partly in section, in which the process according to the present invention may be carried out with advantage.

Referring to the drawing in detail hydrogen is introduced at 1 and joined at 3 with initial carbonaceous material introduced at 2. The mixture is passed through the preheater 4 and then led into the hydrogenation vessel 5 capable of withstanding high pressures. The stirrer 6 driven by any means (not shown) connected with wheel 11 provides for a thorough stirring action.

The vapors of the converted materials leave the hydrogenation vessel 5 at 7, are passed through pipe 8 into the cooler 8a and, after the separation in vessel 8b of the liquid heavier hydrocarbons condensed in cooler 8a, introduced by way of pipe 8c into the washing vessel 9, filled with Raschig rings 11a, where they are treated with washing oil spread in at 10. The pressure in the said washing vessel 9 is about the same as that maintained in the hydrogenation vessel; the temperature is kept at about 20° C. The gases not dissolved by the washing oil which mainly consist of hydrogen leave the washing vessel through pipe 12a and are returned by way of preheater 4 into the hydrogenation vessel 5. The washing oil containing in solution the vapors and part of the gases, in particular the gaseous hydrocarbons and part of the hydrogen, leaves the washing vessel at 12 and flows by way of releasing valve 13 into the vessel 14 in which the liquids collect at the bottom and may be withdrawn at 15 in order to be subjected to distillation. The gases and vapors leave vessel 14 at 16 and are passed into the several-stage-compressor 17 in which they are subjected to fractional condensation. The single fractions are cooled in coils 18a, 18b, 18c, 18d, and 18e respectively, collected in vessels 19, 20, 21, 22, 23 respectively and withdrawn at 24, 25 and 27. The gases not condensed in the last stage of the compression are passed together with the last condensate into vessel 23 and withdrawn therefrom at 23a in order to be again used for the hydrogenation. The pressures maintained in the 1st to 5th stages may advantageously be 3, 9, 27, 80 and 240 atmospheres respectively. The temperatures maintained during compression may be 0° C. or even lower, such as 20° below zero C. Residues formed during the destructive hydrogenation in vessel 5 are withdrawn at 26.

The following example will further illustrate how this invention may be carried into practical effect, but the invention is not restricted to this example.

*Example*

The benzines and middle oils are removed from the mixtures of gases and vapours leaving the reaction chamber in the destructive hydrogenation of brown coal by the employment of a washing oil under pressure: in this manner hydrocarbons such as butane, propane, and small quantities of ethane, methane and hydrogen are dissolved in the washing oil and the condensate to such an extent that the undissolved gases can be again employed as the hydrogenating gas in the process without further treatment. By releasing the pressure on the mixture of washing oil and condensate until it is at atmospheric pressure the preponderating portion of the dissolved gases is again set free and a gas mixture which contains about 60 per cent of hydrogen and about 40 per cent of hydrocarbons is obtained. This gas mixture is compressed in a poly-stage compressor up to a final pressure of from 200 to 250 atmospheres; in stages 1 and 2 under pressures of about 3 and 9 atmospheres, chiefly pentane is obtained, in stage 3 at about 27 atmospheres, butane is obtained, and in stages 4 and 5 at about 80 and 240 atmospheres propane is obtained in the liquid form. The gases leaving the compressor consist mainly of hydrogen, namely from about 80 to 90 per cent, and of from 10 to 20 per cent of hydrocarbons, which consist mainly of methane and small quantities of higher hydrocarbons. By compressing under still greater pressures or at very low temperatures the higher homologues of methane can be practically completely removed from the gas, and for example by far reaching fractionation of the strongly cooled liquid product the single constituents can be recovered in a fairly pure state. The gas which is not condensed is free from hydrocarbons to such an extent that it may be led directly into the circulating gases in the destruction hydrogenation for employment afresh as hydrogenating gas.

What I claim is:

1. In the destructive hydrogenation of distillable carbonaceous materials under a substantially uniform pressure of at least 20 atmospheres, the steps of first separating the hydrocarbons which are liquid at ordinary temperature and pressure from the hydrogen containing gases issuing from the reaction space by washing said gases with an organic solvent while maintaining the pressure, releasing the pressure on the solution thus obtained, subjecting substantially all the hydrogen containing gases obtained by said release of pressure to fractional condensation in several stages of increasing pressure and in each stage at a temperature effecting condensation of normally gaseous hydrocarbons to fractionally separate the said normally gaseous hydrocarbons, no washing oil being added during or after the compression step, and returning the hydrocarbon free hydrogen thus produced to the reaction under pressure generated in said condensation step.

2. In the destructive hydrogenation of brown coal under a substantially uniform pressure of at least 20 atmospheres, the steps of first separating the hydrocarbons which are liquid at ordinary temperature and pressure from the hydrogen containing gases issuing from the reaction, by washing said gases with a washing oil under pressure, releasing the pressure on the solution thus obtained, compressing substantially all the hydrogen containing gas mixture obtained by said release of pressure at a temperature effecting condensation of normally gaseous hydrocarbons to a pressure of 3 atmospheres, in a second stage to 9 atmospheres thus separating pentane, in a third stage to 27 atmospheres thus separating butane, in a fourth stage to about 80 atmospheres, and in a fifth stage to about 240 atmospheres thus separating propane, no washing oil being added during or after the compression step, and then returning the hydrogen remaining after the separation to the reaction under pressure generated in said compressing steps.

MATHIAS PIER.